June 4, 1963 A. J. MACCHI 3,092,014
PANCAKE BAKING APPARATUS
Original Filed Sept. 17, 1959 2 Sheets-Sheet 1

INVENTOR.
Arthur J. Macchi
BY
Clayton L. Jenks
ATTORNEY

June 4, 1963  A. J. MACCHI  3,092,014
PANCAKE BAKING APPARATUS
Original Filed Sept. 17, 1959  2 Sheets-Sheet 2
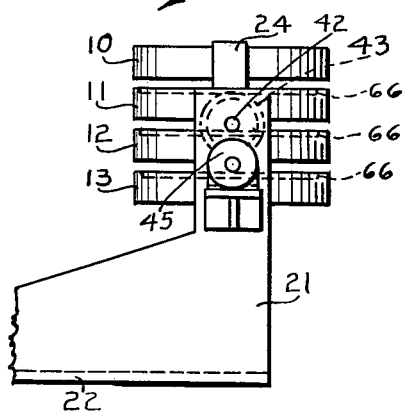
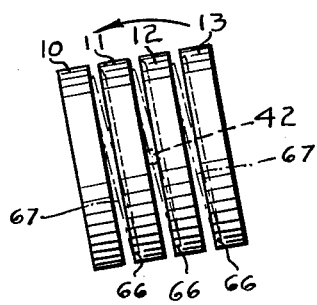
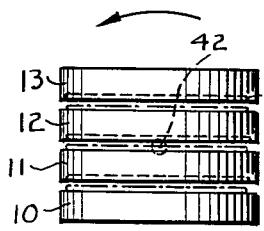
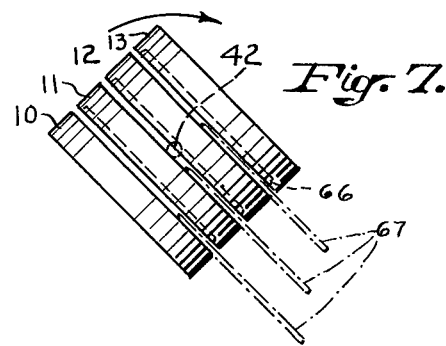
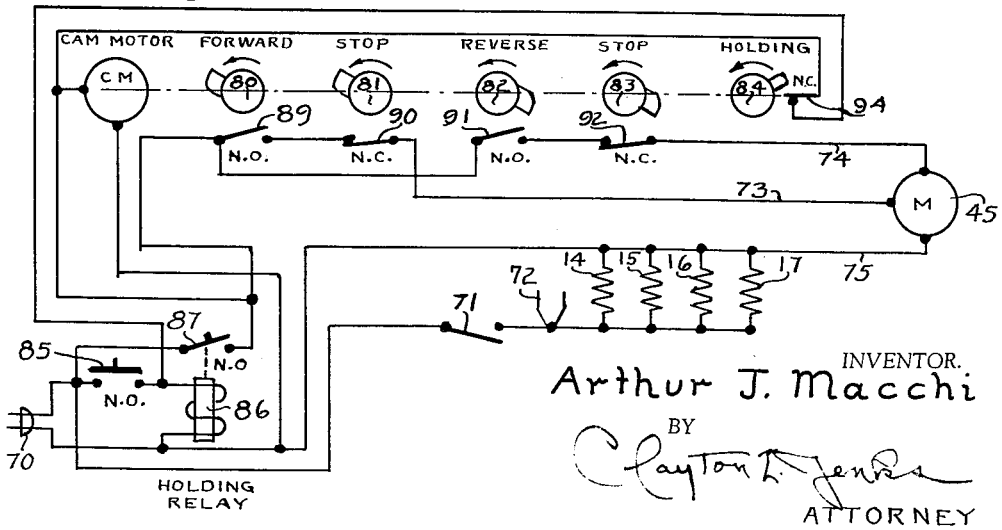
INVENTOR.
Arthur J. Macchi
BY
ATTORNEY

United States Patent Office

3,092,014
Patented June 4, 1963

3,092,014
PANCAKE BAKING APPARATUS
Arthur J. Macchi, 216 Dutcher St., Hopedale, Mass.
Continuation of application Ser. No. 840,713, Sept. 17, 1959. This application Feb. 21, 1962, Ser. No. 176,857
10 Claims. (Cl. 99—423)

This invention relates to an automatic pancake baking apparatus and more particularly to a device which will serve to bake a group of pancakes simultaneously.

Pancakes, or griddle cakes, are usually made by baking a suitable batter on one side and then manually turning the cake over to bake the opposite side. Various mechanical devices have been proposed for baking and turning the cakes over, but they have been complicated, cumbersome and inefficient. It has also been proposed to provide a pair of electrically heated griddles which are so arranged vertically that the batter may be baked on one side of the upper griddle and then, by rotating the griddle, be deposited on the lower griddle for completing the baking operation. This, however, is time-wasting and unsatisfactory because of the requirement that only one pancake may be baked at a time. In a restaurant, it is customary for a customer to ask for a short order of usually three pancakes, and he would like to have them all baked at the same time and be equally hot when received.

It is, accordingly, the primary object of this invention to provide a simple, efficient, small sized apparatus for baking and turning a plurality of cakes simultaneously, and particularly to provide a set of electrically heated grills so mounted that a plurality of cakes may each be simultaneously baked first on one side and then turned over at the same time for completing the baking.

A further object is to provide apparatus comprising a set of reversible grills so shaped and positioned that a cake may be baked on one side of each and then the grill reversed to deposit its cake bottom side upon the grill therebeneath after which the grills may be again reversed and the cakes will slide off the same.

Another object is to provide apparatus of this type wherein a set of grills are mounted in a vertically spaced stack and the lower grills may be moved laterally to suitable positions for depositing batter thereon and then returned to a vertical stack arrangement of one above another where the baking and reversal of the cakes may be effected.

A still further object is to provide automatically operated time controlled electric motor mechanism coordinated with the grills which serves after the batter has been deposited on the grills to bake one side of each cake for a predetermined time and then reverse the grills and deposit each partly baked cake on a grill therebeneath for completing the baking of the opposite side, after which the cakes are automatically removed. Other objects will be apparent in the following disclosure.

In accordance with this invention, a set of grills have their opposite sides shaped and conditioned for baking the batter on both sides thereof. These grills are mounted as a unit in closely spaced parallelism, one above another, and they are provided with opposed pairs of adjacent first and second baking surfaces on juxtaposed sides so arranged that the lower surfaces of the pairs serve for baking a plurality of pan or griddle cakes sumultaneously. They are so mounted that they may be rotated as a unit, either manually or preferably automatically, through a suitable angle to deposit each partly baked cake on the top of the heated grill therebeneath and thus bake the other sides. Each of the lower grills is preferably mounted to be swung laterally to expedite the batter loading operation. The rotation of the grill unit is preferably accomplished by an electric motor. A timed control device may be employed to provide suitable time intervals for both of the baking stages and preferably to control the motor rotation of the grills between the first and second baking stages and finally to discharge the finished cakes. Also, the grills are so constructed that the cakes are held in position during the first half turn rotation but may slide from the grills when they are tilted after the second baking stage. The grills may be rotated reversely through 180° or unidirectionally through 360° to return them to their initial horizontal positions for the application of further batter.

Referring to the drawings which illustrate somewhat diagrammatically a preferred embodiment of the invention:

FIG. 3 is an end elevation;

FIG. 4 is a wiring diagram for the grills, including an automatic timer and motor operating mechanism for rotating the grill unit;

FIGS. 5 and 6 are diagrammatic views of the grills, showing their rotation in one direction from the position of FIG. 3 to that of FIG. 6 which insures the deposition of each half baked cake on the grill therebeneath; and FIG. 7 is a diagrammatic view showing how the reverse rotation of the grills through 180° will cause the completely baked cakes to slide from the flat baking surfaces and be deposited in a dish therebeneath.

Figure 1:
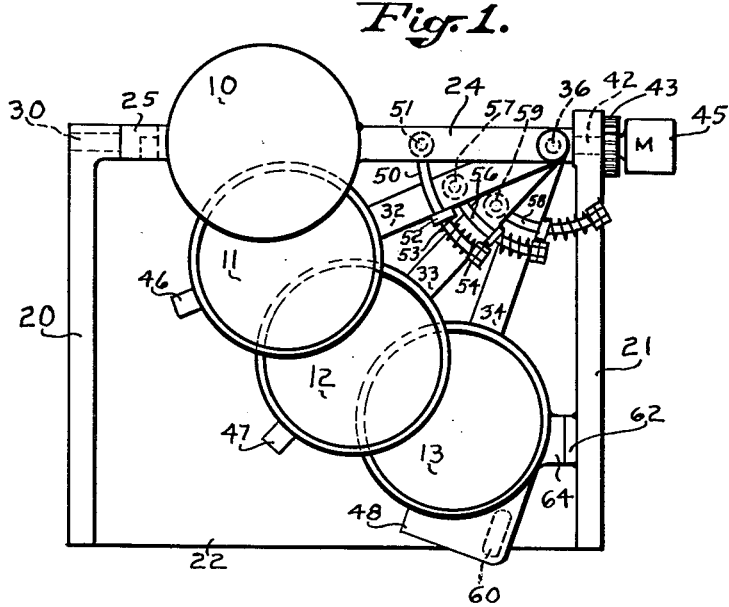
FIG. 1 is a top plan view of the apparatus with the grills arranged as a rotatable unit, but swung laterally to batter loading positions.
Figure 2:
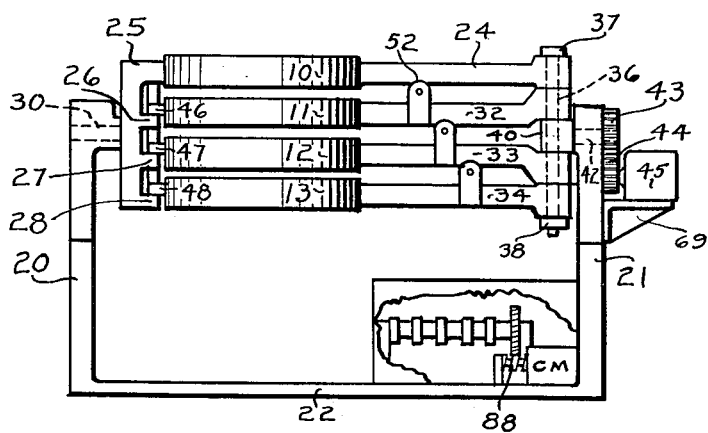
FIG. 2 is a side elevation of the apparatus with the grills in their closed and baking positions.

Referring first to FIGS. 1, 2 and 3, grills 10, 11, 12 and 13, or any other suitable number thereof, are so mounted in a close spacing that they may be rotated as a unit through a suitable angle to cause the cakes thereon to drop onto the tops of grills therebeneath. The batter may be inserted laterally between the grills held in fixed parallelism, but to facilitate the batter loading step, the lower grills in the unit are preferably so mounted that they may be swung from the vertically stacked positions of FIGS. 2 and 3 to the laterally spread out arrangement of FIG. 1. After the batter has been deposited on the laterally displaced grills, the latter are returned to the vertically stacked and substantially parallel arrangement for the cake baking operation.

The grills may comprise electric resistance heating units 14, 15, 16 and 17 (FIG. 4) suitably embedded in insulation and enclosed by substantially parallel external metal disk shaped plates forming the opposed baking surfaces required for the purpose. The grill construction may be in accordance with standard practice except as herein defined. Since the opposite upper and lower surfaces of the cylindrical or disk shaped grill are to be used, they are made of polished metal, such as an aluminum alloy, which is suitable for the high temperature operation, and the heating elements are preferably located centrally between the outer baking faces and coordinated with internal or external thermostat units, or otherwise constructed, so as to insure the required batter baking temperature, as is understood. The constructional details of the grills and the wiring involved in leading the electric current to the heating elements have not been illustrated in the drawings, since this may be of standard construction. Since the grills need to be rotated only through 180° for the cake transfer, it is sufficient to have the lead wires brought from an outside source and connected to each of the plates and so arranged that the wires may twist through the required angle of rotation. However, the wiring for each of the several grills will normally be concealed and connected to a single lead-in circuit, as is obvious.

A simple form of apparatus has the spaced grills mounted as a unit, whether or not laterally displaceable individually, which is arranged to be rotated about a single axis central of the unit, and this consequent revolution of the grills about that axis may be effected by applying a crank to the unit axle. It is, however, preferred to rotate the unit automatically by a time controlled electric motor, and to have the grills mounted for lateral displacement.

To provide for the lateral movement of the several grills, they are preferably mounted on swinging arms assembled as a rotatable unit. A preferred construction comprises a suitable grill support formed of the opposed walls or standards 20 and 21 connected by a base plate 22. A revoluble framework which serves to hold the grills together as a unit and provide for their lateral displacement, comprises an extended horizontal pivoted arm 24 suitably secured to one side of the upper grill 10 and a depending toothed member 25 secured at its upper portion to the opposite side of the same grill. This member has teeth 26, 27 and 28 so shaped and positioned as to constitute supports for lugs on the sides of the grills 11, 12 and 13 therebeneath and whichever side up. Other forms of supports and locks may be used. To provide for rotation of the unit of assembled grills, the toothed member 25 has a centrally located horizontal projecting axle 30 suitably mounted for rotation in bearings in the top of the wall or standard 20. The grills have each an arm projecting laterally and toward the right in FIG. 2 and so arranged that the lower arms may be pivotally assembled beneath the arm 24 of the top grill 10. To that end, the arms 32, 33 and 34 as well as the arm 24 of the top hot plate 10 are each provided at their right hand ends with parallel faced bosses and vertical bearing holes within which a vertical pin 36 is mounted and suitably secured, as by means of a head 37 and nut 38, so that the arms of the grills are held assembled as a rotatable unit, but the lower arms may be swung laterally relative to each other. The pin 36 passes through a central body 40 (FIG. 2) having flat parallel faces contacting parallel faces on the arms 32 and 33 on its opposite sides. The central body 40 has a horizontal axle 42 suitably mounted in the right hand standard 21. The axles 30 and 42 are aligned and provide a rotatable support for the grills.

The pin 42 projects outwardly and may be manually rotated. As shown, it carries a gear 43 fixed thereto which meshes with a smaller or suitable gear 44 fixed on the axle of a small motor 45 of suitable characteristics. The motor wiring and the gears are such as to provide for rotating the grill unit slowly through a required operation. The three lower grills have lugs 46, 47 and 48 respectively at the left which project laterally and are so arranged they will slide between and rest upon the associated teeth 26, 27 and 28 of the toothed pivoted member or framework 25, which is fixed to the grill 10, thus constituting a satisfactory support for the grills while they are located either side up.

Although various constructions may be employed to insure that the grills are in the stacked arrangement during the baking stage and particularly when they are rotated to turn the cakes, the drawings show a preferred construction whereby an arcuate bolt 50 (FIG. 1) is pivoted at 51 to the top bar 24. This bolt passes through a vertical lug 52 fixed on the side of the next lower arm 32 of the grill 11. A compression spring 53 is mounted on the bolt 50 between the lug 52 and a nut 54 threaded on the end of the bolt. This construction is such that when the plate 11 is swung outwardly, the spring 53 is compressed and tends to return the plate to the stacked position of FIG. 2. The other arms 33 and 34 are similarly provided with bolts, lugs and compression springs which likewise urge the arms to return to their stacked position. It will be noted that the bolt 56 which controls the position of the plate 12 is pivoted at 57 on the second arm 32 of plate 11, and the pivot bolt 58 which controls the position of the arm 34 or hot plate 13 is pivoted at 59 on the arm 33. A handle 60 (FIG. 1) may be secured to the side of the lowermost grill 13 for manipulation of the various parts. The grills may be held in their laterally extended positions by a suitable locking mechanism. As shown, this may comprise an Alnico magnet 62 mounted on the framework of the standard 21 and which has an outer flat face adapted to engage and hold magnetically a flat faced magnetic iron lug 64 projecting laterally from the handle 60 so that the operator may forcibly disengage the magnet whereupon the springs return the grills. It will be appreciated that they are held in that vertical arrangement when the motor 45 is operated to cause reversal of the cakes.

The operation of the grills is shown in FIGS. 3, 5, 6 and 7. It will be noted that each of the lower grills 11, 12 and 13 is hollowed out on one side, or at its upper surface in FIG. 3, to provide a suitable recess for the pancake batter and to hold the pancake in place. This provides a peripheral rim 66 which, as shown in FIG. 5, forms a shoulder to prevent the pancake 67 sliding out of position and permitting it to fall in a reverse position on the plate beneath it, as shown in FIG. 6. The hot plate or grill 10 has no such rim and the under faces of the grills 11, 12 and 13, as shown in FIG. 3, are also flat and without a rim where it would interfere with the final lateral discharge of the finished cake. Hence, when the grill unit is reversed from the FIG. 6 position toward that of FIG. 7, each of the pancakes now resting on a flat face which is free from an obstructing rim can slide outwardly as the faces of the grills move toward the vertical and thus be deposited into a suitably placed dish 68. It will also be appreciated that when the grills are revolved in a reverse direction from the position shown in FIG. 7 to that of FIG. 3 the grill 10 becomes the uppermost and the others are located therebeneath in their initial positions.

The batter normally applied to the top surface of each of the lower grills below the top grill will flow somewhat depending upon its viscosity, so that it is desirable that the central portion of the grill be slightly depressed below the periphery to retain the batter. The batter is ordinarily more than half baked during the first stage to a dry and substantially solid condition. Hence, its frictional adhesion to the hot plate and the centrifugal force of revolution of the unit serves to hold the cake in position as it is flopped over, and the slight elevation of the peripheral rim provides a further restraint against lateral slippage of the cake.

Hence, the cyclic movement of the grills is that of rotating through 180° to drop the cakes from their initial positions onto the grills therebeneath. Thereafter, when the grills are rotated to their initial positions and preferably reversely, the cakes slide out and the grills are then positioned as initially and are ready for another batch of batter. The motor should be rotated fast enough to prevent an untimely escape of the cakes. The grills are preferably spaced slightly more than the thickness of a baked cake or greater than the depth of the lower-most portion of the batter holding depression below the rim so as to hold the fluid batter in position and hinder the later sliding of the cake during the first stage revolution of the grill unit. A close spacing of about one-half inch between the rim of a lower grill and the under surface of the next grill thereabove is greater than the depth of the batter holding portion or recess of the grill below the rim top and provides room for the cake to expand during baking and clearance for the lateral discharge of the finished cake. This gives the operator ample freedom in choosing his batter consistency and cake thickness without the expanding cake touching the hot surface thereabove. This close spacing is found in practice to provide ample room for turning the cake onto the next lower grill.

Various types of electrical apparatus and wiring may be employed to accomplish the automatic rotation of the grill unit either through 180° and reverse or through 360°. A suitable wiring diagram is shown in FIG. 4 in which the grill turning motor 45 is of the reversing type and so constructed and arranged that reversal of the direction of the current flow in the windings of the motor effects the reversal of its shaft and a consequent reverse rotation of the grill unit. As shown in FIG. 2, this motor 45 may be suitably mounted on a bracket 69 fixed on the standard 21 or otherwise properly located for the purpose. A suitable source of power derived from the line 70 (FIG. 4) is connected directly through a manually operated switch 71 to the heating elements of the grills 14, 15, 16 and 17. A suitable thermostat 72 is connected into the system to insure that the grills may be heated to a required temperature. The reversing grill motor 45 has a common wire 73 connected to a central terminal through a set of switches and two lead lines 74 and 75. The various switches required in the circuit may be controlled by a timing mechanism, shown diagrammatically as a set of cams 80, 81, 82, 83 and 84 mounted on a common shaft and driven by a cam motor CM. These various cams, which are shown diagrammatically, are so shaped and their high spots so adjusted in position and length as to operate a set of micro switches for controlling the circuit. A manually operated starting switch 85 connected into the power line 70 serves in cooperation with a holding relay 86 and its associated switch 87 to apply power to the cam motor CM, and to start the cycle of switch operations.

When the operator initially thrusts the grills into their baking positions, this action may be employed to close the switch 85. That is, the switch may be mounted on the framework in such a position that when the last grill has moved into the stacked position, it closes the suitably positioned main line switch. This causes the cam motor CM to rotate the camshaft through a single turn, as may be accomplished by means of a slow speed worm gear 88 (FIG. 2). After a suitable baking time, such as 15 seconds, for the first baking step as determined by the switch contact position and length of the high spot of the cam 80, that forward motion cam 80 closes the spring actuated normally open switch 89 and applies power through the lines 73 and 75 for rotating the motor 45 forwardly to cause the grill unit to rotate in the direction of the arrow in FIGS. 3, 5, and 6. The high spot of the cam has sufficient length to hold the switch 89 closed long enough to cause the motor 45 to rotate the grill unit only through 180°. Thereafter, the normally open switch 89 remains open until the cycle is completed. The other cams act in a series operation as will be explained.

To insure a positive breaking of the motor circuit and an exact but adjustable period for the rotation of motor 45, a stop cam 81 may be employed to open the normally closed switch 90 in the power line 73 and thus stop the motor 45. The cams 80 and 81 are coordinated in positions and lengths. After a given period of time for the second baking step, such as 12 seconds, the reversing cam 82 on the constantly rotating cam motor shaft closes the normally open switch 91 in the line 74, which causes the grill turning motor 45 to reverse and turn the grills in the opposite direction. The stop cam 83 is so adjusted in its position and length relative to the reversing cam 82 that it will open the normally closed switch 92 in the power line 74 and stop the revolution of the grills at the time when they have reached their initial position of FIG. 3.

During this operational period, the holding relay 86 has held its switch 87 closed, and it is now necessary to stop the machine and reset it for another cycle. To this end, the holding cam 84 moves forward after the reverse rotation of motor 45 to open the normally closed switch 94 and thus break the circuit of the holding relay 86, and this causes the normally open holding relay switch 87 to open and disconnect the current from the cam motor and stop the cam timing mechanism. The switch 85 is a normally open switch which serves only long enough while held closed to cause the holding relay switch 87 to close and maintain the power line alive during the single rotative turn of the camshaft. Hence, when the holding relay circuit is open, it is necessary again to close the manually operated switch 85 momentarily or long enough to cause the holding relay to close the switch 87 and apply power to the cam motor. The current is connected to the grills through the thermostat 72 as long as the switch 71 is closed. Each of the cams may be made suitably adjustable as to length and position so that it operates at the right time and for the needed delay period.

The operation of this apparatus has been made apparent, but it may be repeated that when an order for hot cakes is received, the operator pulls the grills into the spread apart positions of FIG. 1 and applies the batter to the three lower plates. When he releases the bottom grill 13 from its holding magnet 62, the grills are returned by their springs to the compact vertically stacked arrangement. Then the operator throws the switch 85 or this may be done mechanically, as above stated, to start the cam motor CM to rotate the camshaft. The cakes are baked on one side for a given period of time, such as 15 seconds, before the forward cam 80 closes the switch 89 and causes the reversing motor 45 to turn. After the grills have been turned through 180° and have reached the position of FIG. 6, this causes the cakes to drop from their initial hot plate positions onto the lower plates therebeneath. Then the motor 45 remains still until the reversing cam 82 closes the switch 91 and causes the motor to reverse the grill unit and discharge the cakes into the dish 68. As soon as the grills have again reached the initial position of FIG. 3, the stop cam 83 stops the rotating motor 45 and the holding cam 84 opens switch 94 and breaks the circuit to the holding relay and the whole system is then inactive. By this mechanism, the operator has merely to place the batter on the plates and cause them to return to their vertical baking positions, after which the operation is fully automatic with a final discharge of the cakes fully baked and the grills reset for a new batter charge.

Although stop cams 81 and 83 have been shown diagrammatically in order to clarify the description of the operation, it will be appreciated that these are not needed, since the time of the start and stop and the length of each timing cycle may be fully determined by making the cams 80 and 82 of variable length and adjusting them according to the cake baking requirements. For example, the cam 80 will hold the normally open switch 89 closed during the period while a cylindrical surface on the rotating cam remains in operative contact with the switch, so that the cam 81 and its switch are not needed.

A suitable apparatus may have cylindrical grill plates about 7 or 8 inches diameter and about 1.125 inches to 1.5 inches thick. A spacing between the grills of about 0.5 inch, herein termed "closely spaced" thus makes the grill unit only about 9 inches high. The motors, cams and wiring may be equally compact and arranged largely beneath the swinging arms. Hence, the apparatus is small and light weight and may be mounted on a counter or other suitable location without taking up too much space. Various advantages will be readily apparent to one skilled in the art.

It will be appreciated that various modifications may be made in the structure, either to simplify it for home use or to render it capable of high speed automatic operation for use in a busy restaurant. Hence, the above disclosure is to be interpreted as setting forth the principles of the invention and a preferred embodiment and not as imposing limitations on the appended claims.

This case is a continuation of my prior application, Serial No. 840,713, filed September 17, 1959.

I claim:

1. Pancake baking apparatus comprising a top grill and lower grills therebeneath, said grills providing opposed pairs of first and second baking surfaces on juxtaposed substantially parallel sides, the first baking surfaces being located on the lower grills and each shaped to provide a central batter holding recess for baking a cake and a raised peripheral portion which restrains lateral movement of the cake when the grill is initially revolved, the second baking surfaces being each located on the adjacent grill above and facing the first baking surface of a batter holding recess and being shaped to provide for a lateral discharge of a cake thereon when the grill is revolved, means for mounting the grills with their faces in a vertical spacing as a grill unit, and means for revolving the grill unit through successive stages so that a partly baked cake in the recess of the baking surface will turn over and fall onto the juxtaposed second baking surface which was initially thereabove, said raised peripheral portion of each lower grill being vertically spaced from the juxtaposed second baking surface of the adjacent grill initially thereabove by a distance greater than the depth of said recess which provides for the lateral discharge of a baked cake from said second surface when the grill is revolved.

2. Apparatus according to claim 1 in which the means for mounting and revolving the grills comprises lateral arms, each separately attached to one of the lower grills, a vertical axis pivot means carrying said arms which provides for a separate lateral swinging of each lower grill arm and its grill and a horizontal shaft carrying said pivot means which serves for revolving the grills and their arms as a unit.

3. Pancake baking apparatus comprising a top grill and a plurality of lower grills therebeneath, each grill having an electrical resistance heating unit therein, means for supporting the grills in a vertical spacing and initially horizontal as a grill unit which is revolvable about a horizontal axis, said grills providing opposed pairs of substantially parallel first and second baking surfaces on the juxtaposed sides of adjacent grills, each lower grill having an initially upper first baking surface shaped to provide a batter holding recess for baking a cake and a raised peripheral portion which restrains lateral movement of the cake thereon when the unit is initially revolved, the second baking surface of the adjacent grill initially above and facing a first baking surface of said batter holding recess being spaced from the raised portion of the juxtaposed first baking surface and shaped to provide for a lateral discharge of a cake thereon when the grill unit is revolved, an electric motor connected to revolve the grill unit, means providing an electric power circuit therefor, and an automatically actuated time-controlled mechanism which controls said circuit and causes the motor to rotate the unit intermittently in two time separated cycles of about 180° each.

4. Baking apparatus comprising a top grill and lower grills vertically attached therebeneath which provide opposed pairs of first and second baking surfaces on juxtaposed, substantially parallel sides, the first baking surfaces being initially on the top sides of the lower grills and the second baking surfaces being initially on the under sides of the grills opposed to the first baking surfaces, a horizontal arm attached to each lower grill, a shaft mounted for revolution about a horizontal axis, means for rotating the shaft, a body carried by said shaft, a vertical axis pivot means on said body which supports the outer ends of said arms and provides for a separate lateral swinging of the arms and exposing the grills for the reception of batter and means for releasably holding the grills and their arms in a parallel displacement.

5. Baking apparatus according to claim 4 comprising a set of springs interconnecting the arms which urge the grills towards a vertically stacked arrangement.

6. Apparatus according to claim 3 in which the time control mechanism comprises a cam motor and a set of cams rotated thereby and wherein the circuit for the grill rotating motor includes switches governed by the cams, said cams and switches causing the grill rotating motor to rotate the grill unit through 180° after a baking time interval and then rotate the unit to its initial position after a further baking time interval and thereafter stop.

7. Baking apparatus comprising a top grill and lower grills vertically spaced therebeneath, said grills having pairs of first and second baking surfaces on substantially parallel sides, the first baking surfaces being initially on the top side of said lower grills and the second baking surfaces being initially on the under sides of the grills opposed to said first baking surfaces, a horizontal arm attached to a lower grill, a vertical axis pivot means carrying said arm, which provides for moving the attached lower grill laterally towards and from a vertically spaced arrangement beneath the top grill, and a horizontal axis pivot means carrying said grills which serves for revolving the grills as a unit through a half turn when the grills are in the vertically spaced arrangement.

8. Baking apparatus according to claim 7 comprising means for releasably holding said arm and its attached grill laterally displaced relative to the top grill.

9. Baking apparatus according to claim 7 comprising means providing a power current, an electric motor in said circuit to rotate the grills when assembled as a unit and an automatically actuated time controlled mechanism controlling said circuit which causes the motor to rotate the grills after a predetermined baking time interval.

10. Pancake baking apparatus comprising a top grill and lower vertically spaced grills therebeneath, said grills providing opposed pairs of first and second baking surfaces on substantially parallel sides, said first baking surfaces being initially on the top sides of the lower grills and each shaped to hold batter thereon for baking a cake, said second baking surfaces being located on the adjacent grill above and facing said first baking surface and being shaped for a lateral discharge of a cake baked thereon, an arm attached to a lower grill, a vertical axis pivot means for swinging said arm laterally and moving the attached grill towards and from a vertically spaced arrangement beneath the top grill, horizontal axis pivot means which serves for rotating all of the grills as a unit when they are in a vertically spaced arrangement for discharging the cakes on said first baking surfaces onto the second baking surfaces therebeneath, and means for moving the grills to cause the finished cakes to slide laterally from said first baking surfaces.

References Cited in the file of this patent

UNITED STATES PATENTS

| 1,675,545 | Goss | July 3, 1928 |
| 2,116,688 | Ratliff | May 10, 1938 |
| 2,523,641 | Alvarez | Sept. 26, 1950 |
| 2,830,529 | Jaffe | Apr. 15, 1958 |